US008888660B1

(12) United States Patent
Oteman

(10) Patent No.: US 8,888,660 B1
(45) Date of Patent: Nov. 18, 2014

(54) ENERGY HARVESTER FOR EXERCISE EQUIPMENT

(75) Inventor: David George Oteman, Delafield, WI (US)

(73) Assignee: Strength Companion, LLC, Delafield, WI (US)

( * ) Notice: Subject to any disclaimer, the term of this patent is extended or adjusted under 35 U.S.C. 154(b) by 507 days.

(21) Appl. No.: 13/282,046

(22) Filed: Oct. 26, 2011

Related U.S. Application Data

(60) Provisional application No. 61/409,122, filed on Nov. 2, 2010.

(51) Int. Cl.
*A63B 24/00* (2006.01)
(52) U.S. Cl.
USPC ............ 482/2; 482/1; 482/8; 482/9; 482/901
(58) Field of Classification Search
USPC .................. 482/1–9, 900–902; 434/247, 253
See application file for complete search history.

(56) References Cited

U.S. PATENT DOCUMENTS

| | | | |
|---|---|---|---|
| 1,006,470 A | 10/1911 | Duffner | |
| 3,848,467 A * | 11/1974 | Flavell | 482/4 |
| 4,082,267 A * | 4/1978 | Flavell | 482/6 |
| 4,261,562 A * | 4/1981 | Flavell | 482/6 |
| 4,298,893 A | 11/1981 | Holmes | |
| 6,342,028 B1 | 1/2002 | de Sane | |
| 7,485,076 B2 | 2/2009 | Lee | |
| 7,504,737 B2 | 3/2009 | Vasilovich et al. | |
| 7,628,737 B2 | 12/2009 | Kowallis et al. | |
| 7,704,190 B2 | 4/2010 | Lin et al. | |
| 7,811,201 B1 | 10/2010 | Mikan et al. | |
| 8,118,710 B2 * | 2/2012 | Weinman et al. | 482/2 |
| 8,328,692 B2 * | 12/2012 | Lin | 482/2 |
| 2007/0270282 A1 * | 11/2007 | Falcone | 482/8 |
| 2008/0172328 A1 | 7/2008 | Ajilian | |
| 2009/0054207 A1 | 2/2009 | Lin et al. | |
| 2009/0170661 A1 | 7/2009 | Hsiao | |
| 2009/0247366 A1 | 10/2009 | Frumer | |
| 2009/0280960 A1 | 11/2009 | Tian | |
| 2010/0167876 A1 | 7/2010 | Cheng | |
| 2010/0197460 A1 | 8/2010 | Czarnecki | |
| 2011/0111922 A1 * | 5/2011 | Weinman et al. | 482/2 |
| 2011/0234175 A1 * | 9/2011 | Hajee et al. | 320/164 |
| 2011/0294623 A1 * | 12/2011 | Alessandri et al. | 482/2 |
| 2012/0088634 A1 * | 4/2012 | Heidecke | 482/2 |
| 2012/0270194 A1 * | 10/2012 | Kuijpers | 434/253 |
| 2013/0065680 A1 * | 3/2013 | Zavadsky et al. | 463/30 |

* cited by examiner

*Primary Examiner* — Glenn Richman
(74) *Attorney, Agent, or Firm* — Ryan Kromholz & Manion, S.C.

(57) ABSTRACT

An energy harvester system is provided in and responsive to movement of a motion control arrangement of an exercise machine for converting kinetic and ambient light energy supplied from an environment of the exercise equipment into electrical power which is delivered to a feedback system associated with the exercise equipment in order to provide information corresponding to the user of the exercise equipment.

2 Claims, 14 Drawing Sheets

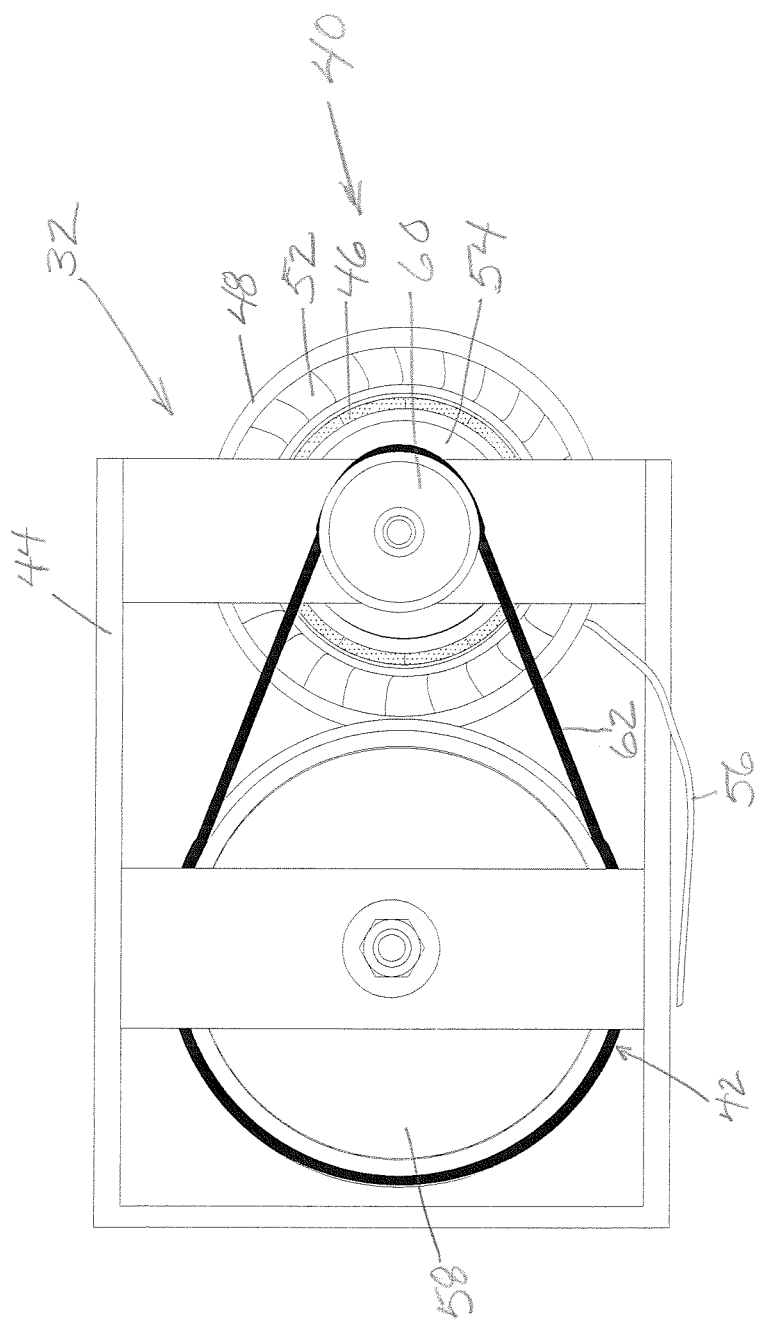

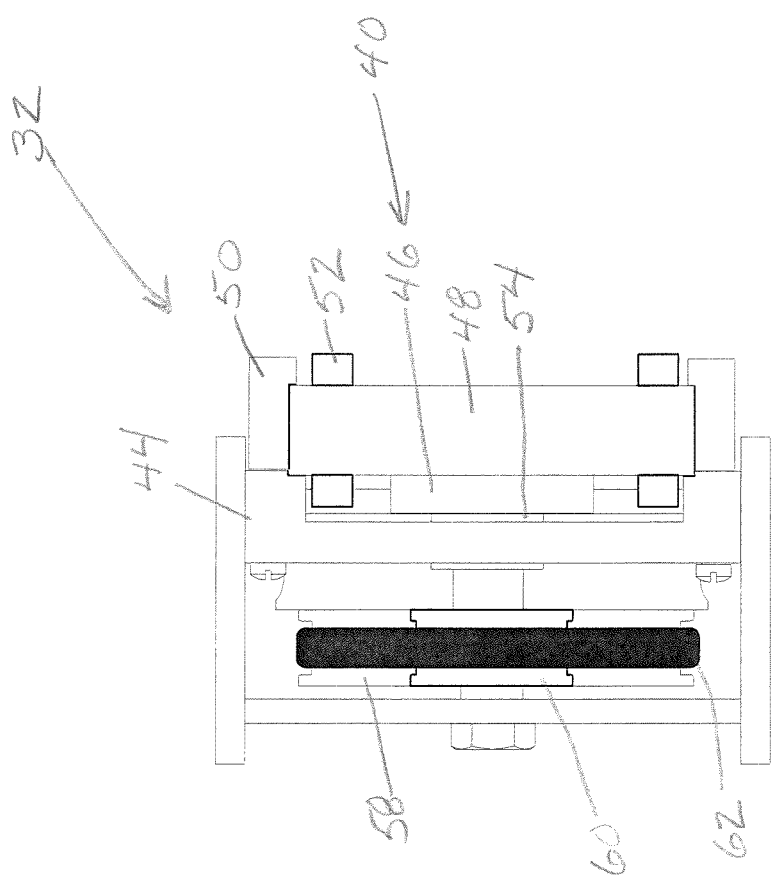

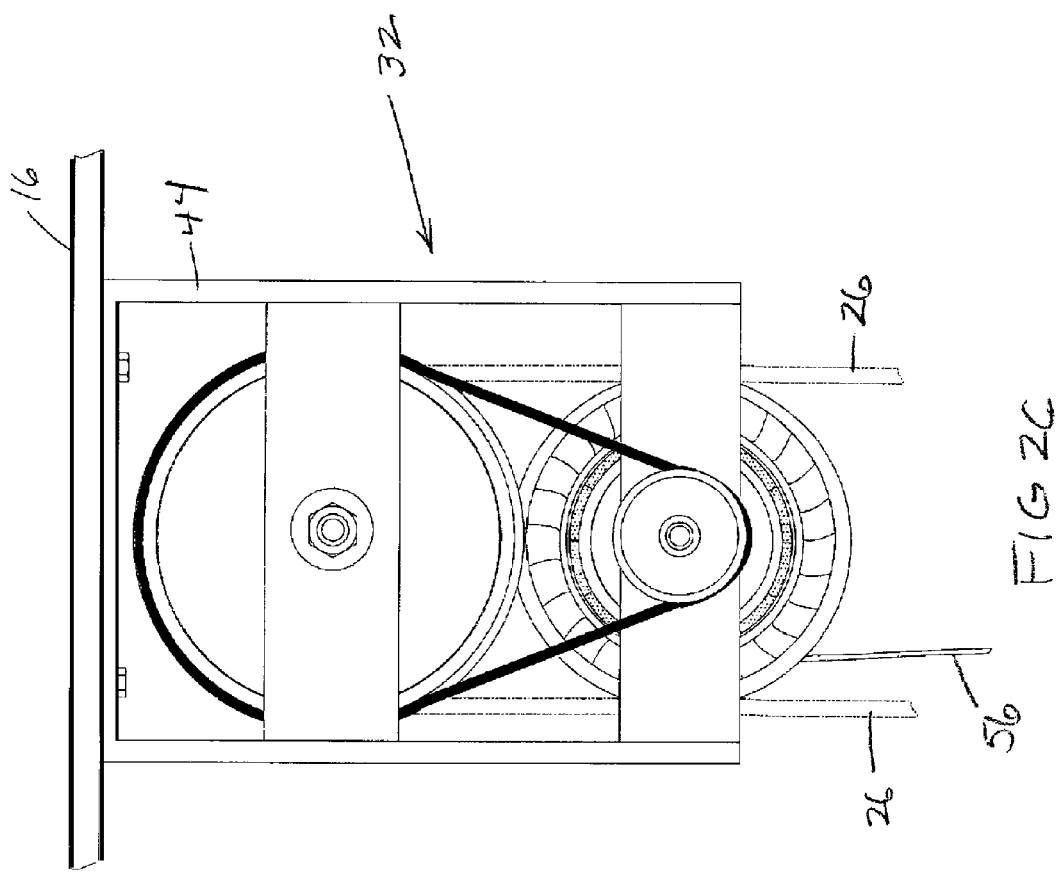

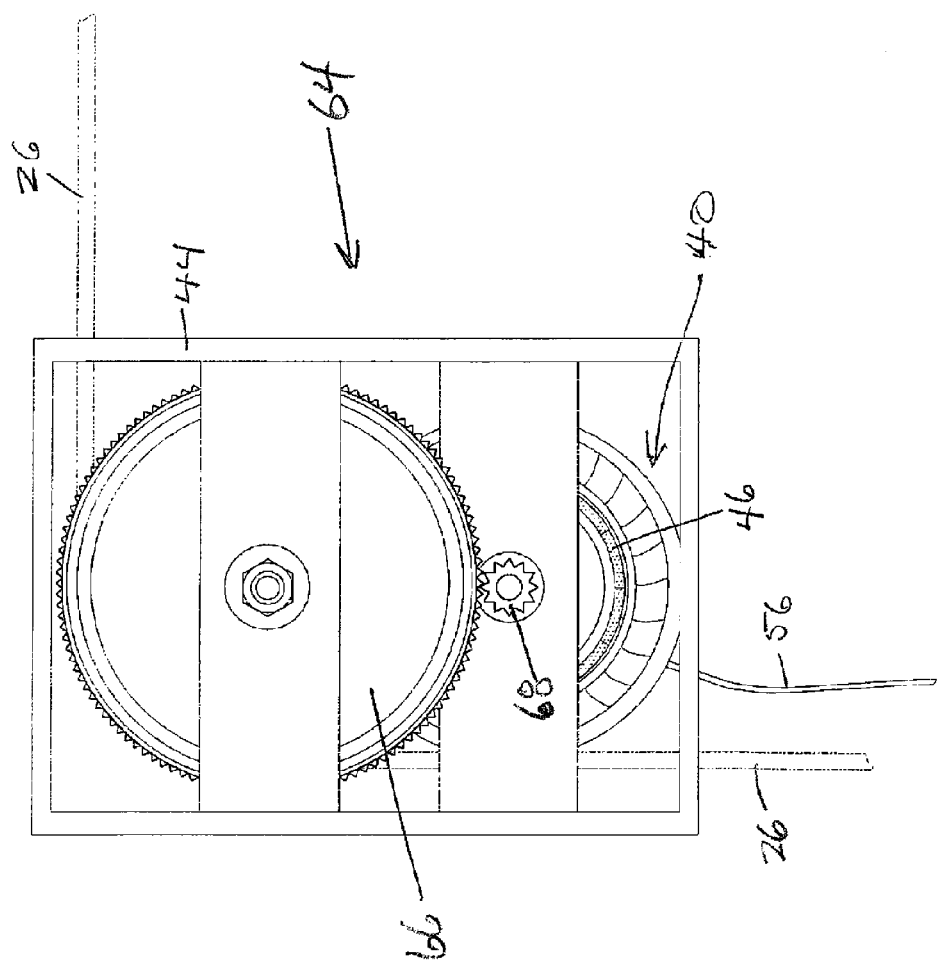

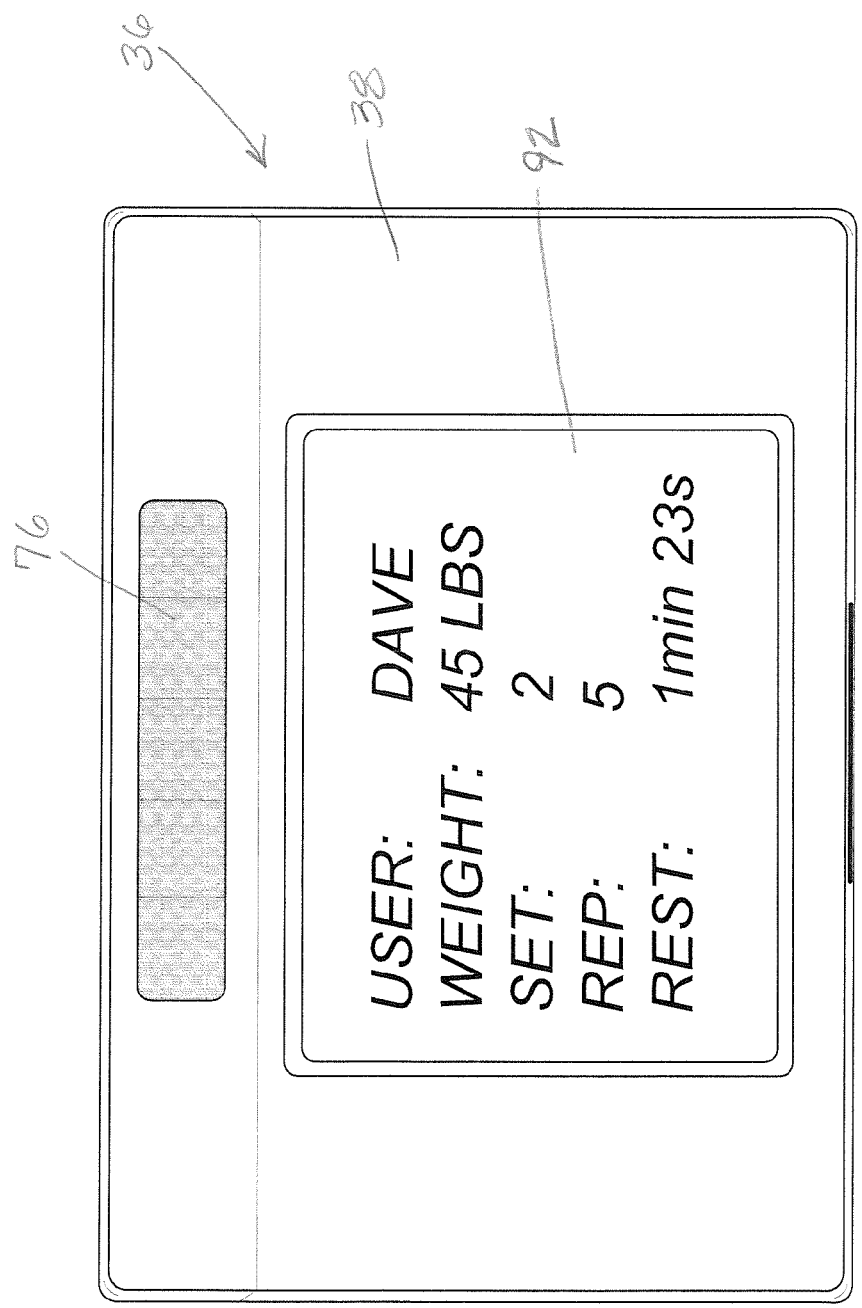

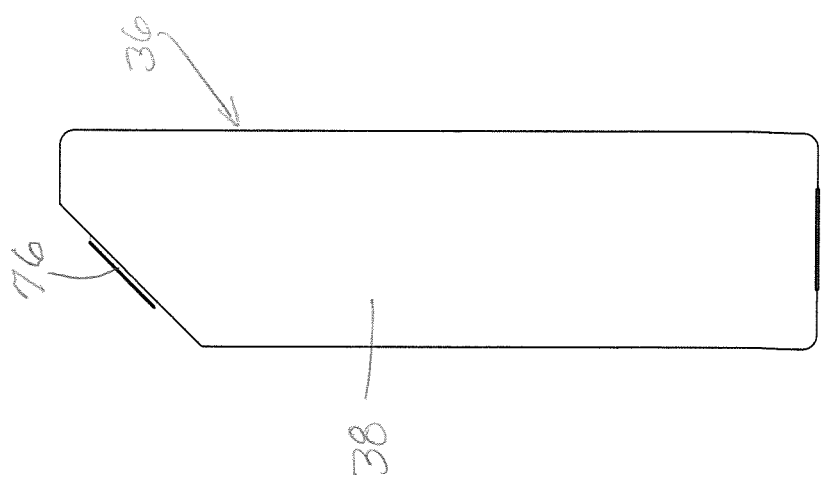

ENERGY HARVESTER FOR EXERCISE EQUIPMENT

CROSS REFERENCE TO RELATED APPLICATION

The present application relates to and claims priority from U.S. Provisional Patent Application Ser. No. 61/409,122, filed Nov. 2, 2010.

BACKGROUND

The present disclosure relates generally to exercise equipment and, more specifically, pertains to strength training equipment that functions using one or more rotating members to independently power an electrical system that is part of the equipment.

DESCRIPTION OF PRIOR ART

Modern cardiovascular fitness equipment, such as treadmills and elliptical machines typically include a system of displaying exercise metrics and cardiovascular performance feedback to the user of the equipment. These systems have generally been called fitness feedback systems. This type of feedback is generally accomplished via an LED or LCD screen and provides the user real-time data as well as workout summary information. This type of feedback display system is standard and pervasive and has become a consumer expectation.

In a typical fitness gym layout, a section of the facility will be dedicated to cardiovascular equipment which is normally powered by an external source. The cardiovascular machines are generally arranged in parallel rows, facing televisions or may even have an integrated television screen. The equipment will generally plug into 120 VAC or 240 VAC outlets in the United States. In a facility that was purpose-built for fitness, an electrical infrastructure can be designed to make it convenient to plug in the cardiovascular equipment. In many gym facilities, the routing of electricity to the machines must be accomplished retroactively and can lead to costly and unsightly electrical infrastructure.

Though less common, some cardiovascular equipment such as certain stationary cycle designs, have successfully harnessed the energy input of the user (human-powered). This allows for a degree of freedom in the layout of the fitness gym because the equipment need not be in close proximity to an electrical outlet. Another advantage is that, especially in gyms with many machines, the human-powered machines can reduce facility electricity costs because the equipment does not draw power from the electric utility.

In contrast to the cardiovascular equipment described above, modern strength machines generally lack an analogous strength performance or fitness feedback display system. There is, however, just as pronounced a consumer need as in the cardiovascular market to have the experience of performance feedback on strength training equipment. Users of strength equipment can utilize a feedback system to further improve their strength conditioning, and more precisely meet their strength training goals when compared with using equipment that does not have a feedback or reporting system.

Several factors have limited the adoption of such a fitness feedback display system in strength equipment. A significant factor is related to the practical problem of routing electricity to such a system. The equipment layout requirements in the weight/strength training areas of a fitness gym are substantially different than in the cardiovascular areas. Some key reasons driving these differences are summarized below:

1. Strength training areas do not use the same or even similar type of equipment as in the cardio areas. There are different types of strength equipment for each muscle group of the human body. In addition, many gyms will provide two different manufacturers of strength equipment to better meet the varied preferences of their members. Each of these machines requires a different footprint of floor area, and has a different entry access requirement, e.g. side, front, rear for the user of the equipment. As a result, it is virtually impossible to design an electrical outlet infrastructure ahead of time to conveniently support the necessary mix of strength machines in the gym.

2. As gyms adopt new and improved equipment to satisfy their customers, a previous electrical infrastructure will be very unlikely to conveniently support the new equipment types, and is not a constraint that the gym manager wants to address.

3. Strength workout areas require users of the equipment to access the equipment from multiple directions. In addition, exercisers in a strength area often walk between machines to access other areas of the gym. As a result, running electrical cords to outlets on the floor pose a significant tripping hazard to the users and/or require a highly inconvenient equipment layout to avoid such hazards.

4. Strength equipment has a tendency to move on the floor over time. This is due to the necessary reaction forces taken through the floor mounts, which arise naturally through the normal use of equipment. These slight, but persistent movements, would be problematic for ensuring that the equipment does not become unplugged, or create an electrical hazard.

For these reasons, it is desirable for strength equipment with a performance feedback and display system to avoid the use of the gym facility electrical outlet and outlets.

Methods of eliminating the external power requirement for exercise feedback systems, i.e. a strength performance feedback system, in strength equipment have not been widely adopted in modern equipment. Batteries have been used to a limited extent as a means of powering a fitness feedback system or a repetition counter. Batteries are problematic because the functionality of the fitness feedback system must be reduced such that the electronics require sufficiently low power to accommodate a reasonable battery life. An additional disadvantage of batteries is the required operating cost due to the need for the batteries to be replaced and/or recharged.

BRIEF SUMMARY

It is one object of the present disclosure to provide an electrical power generation and power conditioning system, herein referred to as an energy harvester system, capable of supplying the power requirements for electronics used in exercise equipment and particularly strength training equipment (herein, referred to as the electronics load), without requiring the use of an external electrical outlet or external electrical power source, or batteries, and the required maintenance and replacement of such batteries. The approach of the present disclosure is to harvest energy exclusively from the environment, including kinetic energy created as a result of motion caused by the force imparted by the user to overcome the resistance of the strength training equipment during an exercise. The energy harvester system of the present disclosure also harvests photovoltaic energy available from the lighting environment that is present in the fitness facilities in which the strength equipment is located. The energy harvester system is capable of creating a stable output voltage suitable for proper operation of the electronics load typically consisting of electronics (e.g. LCD displays, sensors, data entry keypads, user identification systems, etc.) for a fitness feedback system associated with the exercise or strength training equipment.

It is a further object of the present disclosure to provide an energy harvester system that supplies sufficient power to a fitness feedback system that requires standby power, even when the equipment is not in use. An example of such a standby system would be a user identification system that must be able to identify a user of the equipment before the user begins the first repetition of the exercise.

It is another object of the present disclosure to provide an energy harvester system which is imperceptible to the user of the exercise or strength equipment. The generating function of the energy harvester system causes certain unavoidable forces to be exerted on the weight stack. The energy harvester system ensures that these forces are precisely controlled so that they are imperceptible to the user during exercise, while still providing sufficient power to the fitness feedback system.

It is an additional object of the present disclosure to provide an energy harvester system that utilizes mechanical advantage for the purposes of minimizing system material cost and minimizing the forces that result from generating electricity from the motion of the strength equipment.

Still another object of the present disclosure is to provide an energy harvester system which can integrate easily into multiple types of strength training equipment for example, bicep curl, leg extension, lateral pull down, vertical press) by replacing a standard OEM pulley assembly with an energy harvester pulley generator assembly. The energy harvester pulley generator assembly features minimal additional space requirement relative to a standard pulley, and also does not have difficult restrictions on mounting or location within the exercise equipment.

The present disclosure relates to exercise equipment, such as strength training equipment, provided with a motion control arrangement configured to move in response to stimulus of a user. The exercise equipment is improved by an energy harvester system incorporated in and responsive to movement of the motion control arrangement of the exercise equipment for converting kinetic and ambient light energy supplied from an environment of the exercise equipment into electrical power which is delivered to a feedback system associated with the exercise equipment in order to provide information corresponding to the user of the exercise equipment.

The energy harvester system delivers electrical power to the feedback system independent of any battery or external power source. The energy harvester system includes control electronics for converting at least the kinetic energy into the electrical power delivered to the feedback system.

The present disclosure also relates to an energy harvester system incorporated in and responsive to movement of a motion control arrangement of an exercise equipment configured to move in response to a stimulus provided by a user. The energy harvester system includes a kinetic energy harvester for converting kinetic energy provided due to the movement of the motion control arrangement of the exercise equipment into electrical power. The energy harvester system also includes a photovoltaic energy harvester for converting photovoltaic energy provided by an ambient light environment associated with the exercise equipment into electrical power. The electrical power from the kinetic and photovoltaic energy harvesters is delivered to a feedback system connected to the exercise equipment exclusive of any battery or external power source.

The kinetic energy harvester includes a pulley generator assembly comprised of a generator operably connected to a belt and pulley system, and engaged with the motion control arrangement of the exercise equipment. The generator includes a frame secured to the exercise equipment, a stator fixed to the frame, and a rotor mounted to the frame for rotation within the stator. The belt and pulley system includes a high speed pulley rotatably mounted to the frame, a low speed pulley rotatably mounted to the frame and spaced from the high speed pulley, and a belt entrained around the high speed and low speed pulleys. A diameter of the low speed pulley is greater than a diameter of the high speed pulley. The low speed pulley is engaged with the motion control arrangement of the exercise equipment. In place of the belt and pulley system, the generator can also be coupled to a set of meshing gears. The generator is connected to control electronics for converting electrical energy into the electrical power delivered to the feedback system. The control electronics includes a three phase power inverter, an electrical energy storage element, a DC/DC converter connected to the feedback system and a harvester controller interconnected to the inverter, the electrical energy storage element and the DC/DC converter. The control electronics further includes a combiner circuit for delivering electrical power from the kinetic and photovoltaic energy harvesters. In addition, the control electronics includes an overvoltage protection arrangement connected to the inverter.

The photovoltaic energy harvester includes a photovoltaic array for processing light energy available from commercial lighting and sunlight present in the ambient light environment associated with the exercise equipment. The photovoltaic array includes an electrical energy storage element connected to the feedback system. The photovoltaic array may include a maximum power point tracker. In one embodiment, the photovoltaic array is mounted on the exercise equipment. In another embodiment, the photovoltaic array is mounted on the feedback system. The feedback system includes an electronic console having a display screen for providing identification and workout performance data corresponding to the user of the exercise equipment.

The present disclosure also contemplates a method of producing and utilizing electrical power in exercise equipment having a motion control arrangement. The method includes the steps of a) converting kinetic energy in a kinetic harvesting mode provided due to the movement of the motion control arrangement of the exercise equipment into electrical power; b) converting photovoltaic energy in a photovoltaic harvesting mode provided by an ambient light environment associated with the exercise into electrical power; and c) delivering the electrical power resulting from the converted kinetic and photovoltaic energy to a feedback system associated with the exercise equipment to provide information related to a user of the exercise equipment.

Steps a), b), and c) are performed exclusive of any battery or external power source. Step a) is performed utilizing a pulley generator assembly, and step b) is performed utilizing a photovoltaic array. Steps a) and b) are performed utilizing control electronics which switch between the kinetic harvesting mode and the photovoltaic harvesting mode depending on movement of the motion control arrangement of the exercise equipment.

BRIEF DESCRIPTION OF THE DRAWINGS

The drawings illustrate the best mode present contemplated in the carrying out the disclosure In the drawings:

FIG. 2A illustrates a front view of a pulley generator assembly having an electrical generator, a high speed pulley, a coupling belt, and a low speed pulley that is used in the energy harvester system with the exercise equipment of 1A;

FIG. 2B illustrates a side view of the pulley generator assembly of FIG. 2A;

FIG. 2C illustrates a view of the pulley generator assembly of FIG. 2A utilized with a low speed pulley connecting a weight stack cable or belt at a 90 degree angle;

FIG. 2E illustrates a view of a gear generator assembly connecting a weight stack cable or belt at a 90 degree angle;

FIG. 3A illustrates a front view of an exemplary console for displaying exercise related information, having an integrated photovoltaic array as part of a system for the energy harvester system;

FIG. 3B illustrates a side view of the console of FIG. 3A;

DETAILED DESCRIPTION OF THE PREFERRED EMBODIMENT

The present disclosure relates to an energy harvester system for use with an exercise device. In particular, the energy harvester system produces output power which is suitable for an electronics load that can be used in strength training equipment, including, but not limited to, LCD and LED displays, microcontrollers, memory devices, sensors and wireless communication electronics. A typical use of electronics and strength exercise equipment is for a fitness feedback system. The energy harvester system relies on two modes of operation. In the first mode (kinetic harvesting mode), the energy harvester system converts kinetic energy due to the motion of the exercise equipment into electrical energy. In the second mode (the standby harvesting mode), the energy harvester system converts energy from the environment, such as the energy in the ambient-radiated light, into electrical energy. The two modes may be employed by the energy harvester system at different times, or at the same time, and operate without requiring any battery or source of external power.

Figure 1A:
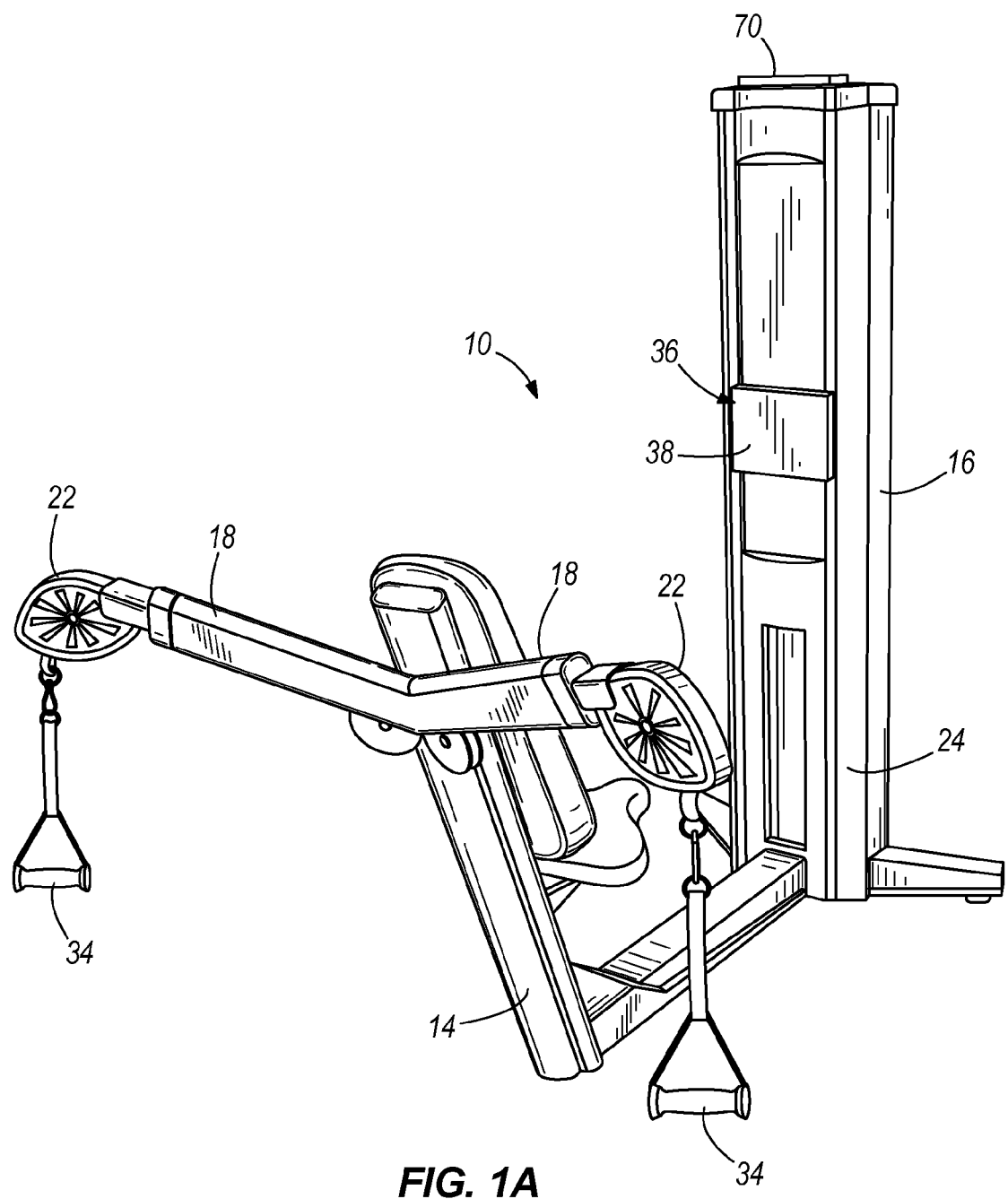
FIG. 1A illustrates a perspective view of exercise equipment having an energy harvester system according to the present disclosure.
Figure 1B:
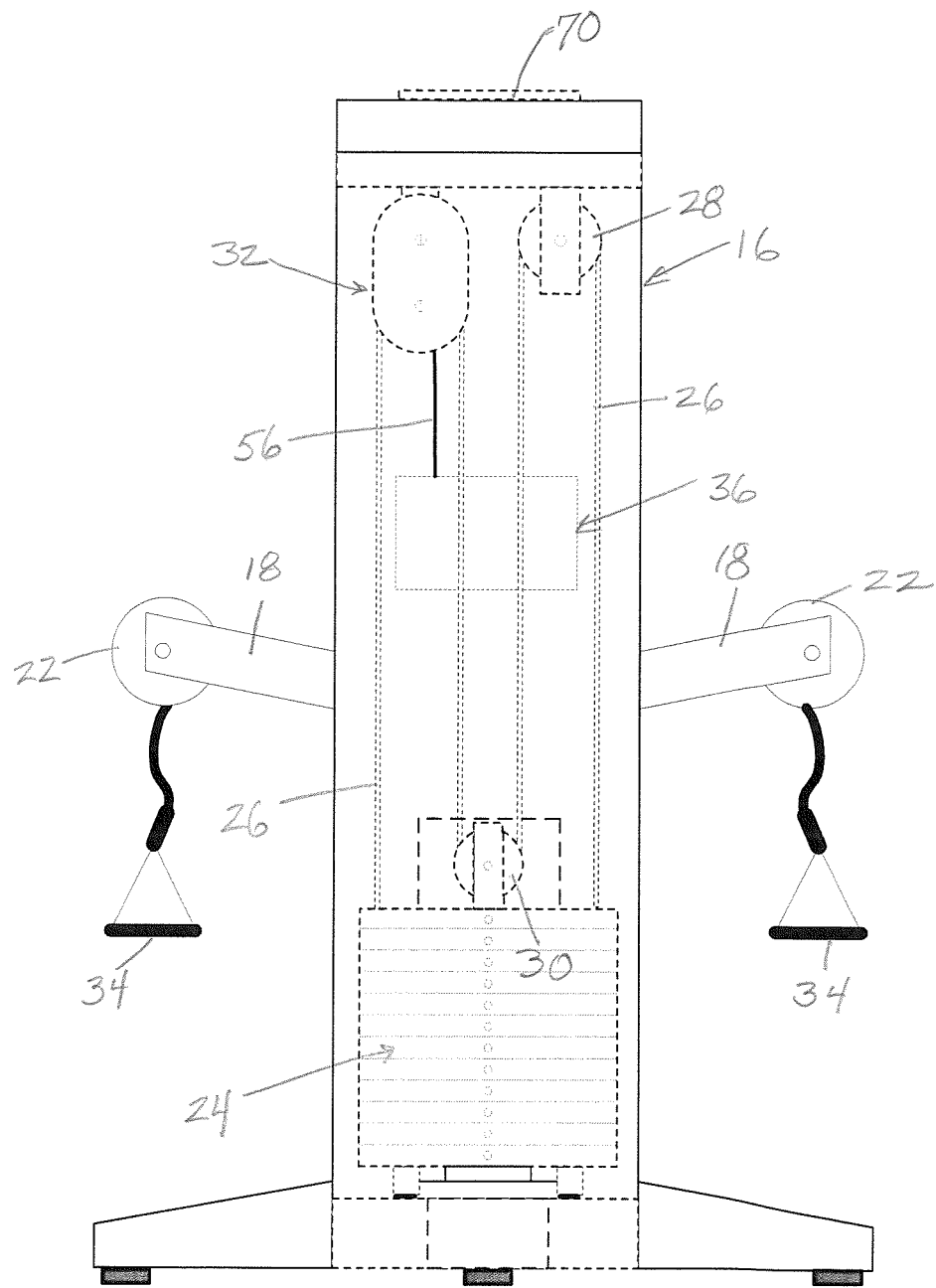
FIG. 1B illustrates a rear view of the exercise equipment depicted in FIG. 1A.
Figure 4A:
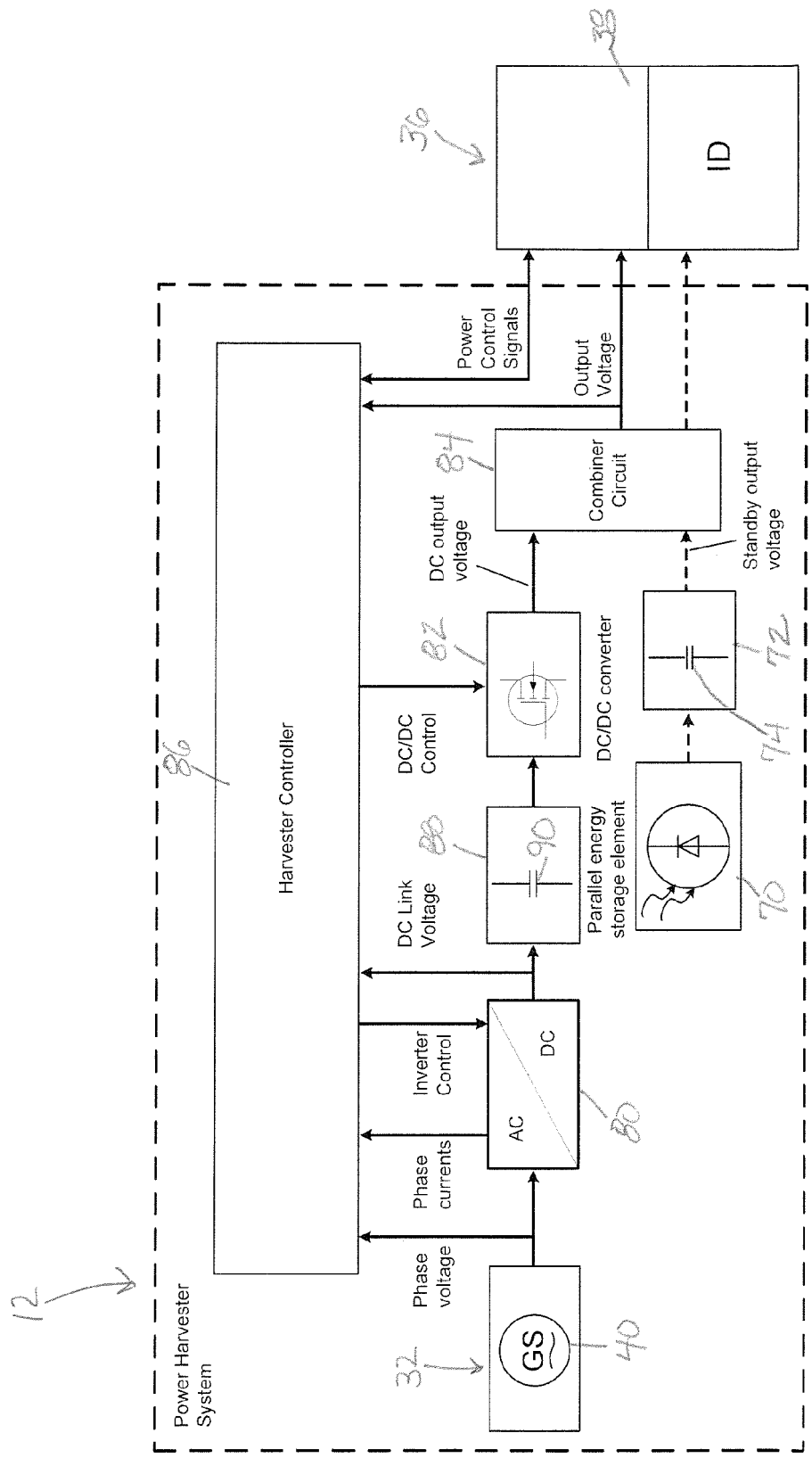
FIG. 4A is a block diagram illustrating the components and interfaces of control electronics for the energy harvester system.

Referring now to the drawings, FIGS. 1A and 1B illustrate exercise equipment 10, as exemplified by strength training equipment, provided with an independent power generating energy harvester system depicted as reference numeral 12 in FIG. 4A.

The strength training equipment 10 is shown as a weight training machine having a seated portion 14 connected to an upright support portion 16. The seated portion 14 includes a pair of laterally extending arms 18 equipped with a pair of inner pulleys 20 and a pair of outer pulleys 22. The upright support portion 16 includes a resistance arrangement embodied in a weight stack 24 formed by a plurality of weight plates which are arranged to move up and down in various combination on guides as is well known in the exercise equipment art. A belt or cable 26 is guided around the outer pulleys 22, along the arms 18, around the inner pulleys 20 and down along the seated portion 14 into the upright support portion 16.

The belt or cable 26 is then directed around an upper pulley 28 connected to a top end of an upright support portion 16, a lower pulley 30 secured to the upper end of the weight stack 24, and a pulley generator assembly 32 also joined to the top end of the upright support portion 16. The pulley generator assembly 32 forms part of the energy harvester system 12 and takes the place of a standard pulley which would normally be present in the weight training machine 10. However, it would also be possible to dedicate a pulley as an "energy harvester pulley," whereby the standard pulleys would remain, and an energy harvester would be added. The belt or cable 26 has outermost ends attached to a pair of gripping handles 34 so that the selected weight plates in weight stack 24 may be moved up and down to provide variable resistance when a user pulls and releases the handles 34. The pulleys 20, 22, weight stack 24, belt or cable 26, pulleys 28, 30, and handles 34 all cooperate with the pulley generator assembly 32 to form a motion control arrangement configured to move in response to stimulus from a user seated in the equipment 10. One skilled in the art should appreciate that the motion control arrangement may otherwise be formed by different linkages, and resistance components used in combination with the pulley generator assembly 32.

The strength training equipment 10 includes a fitness feedback system 36 for processing and providing information related to the user of the equipment 10. The fitness feedback system 36 is typically comprised of suitable electronics, such as LCD or LED displays, sensors, data entry keyboard, touch screens, microcontrollers, and wireless communication devices for providing user identification, strength performance and workout summary data. In the example shown in FIG. 1A, the fitness feedback system 36 includes an electronic display console 38 which is mounted to a front face of the upright portion 16 of the strength training equipment 10 so that it will be clearly visible and accessible to the user positioned on the seated portion 14. The feedback system 36 could also be designed to provide and process information by means of speech input and output.

In one embodiment of the present disclosure, the energy harvester system 12 is incorporated in and responsive to motion of the exercise equipment 10 as a result of a stimulus supplied by the user. The energy harvester system 12 is generally comprised of a kinetic energy harvester for converting kinetic energy provided due to the motion of the equipment 10 into electrical energy, a photovoltaic energy harvester for converting photovoltaic energy provided by ambient light environment associated with the equipment 10 into electrical energy, and control electronics for controlling the kinetic and photovoltaic energy harvesters to provide electrical power to an electronics load of the fitness feedback system 36 exclusive of any battery or external power source.

Referring to FIGS. 2A and 2B, the kinetic energy harvester includes the pulley generator assembly 32 having an electricity generator 40 and a belt and pulley system 42 which are mounted to a frame 44 that is secured to the upright portion 16 of the exercise equipment 10.

The electricity generator 40 is preferably a three phase radial flux permanent magnet-type and consists of a round rotating member or rotor 46 that is rotatably mounted on frame 44, and a stationary member or stator 48 that is fixed to the frame 44 by a mounting clamp 50. The rotor 46 consists of a plurality of permanent magnets disposed on the outer circumference of the rotor 46 arranged such that the magnetic polarity of the magnets is alternating. The stator 48 consists of a hollow core of ferromagnetic material, comprising a circular inner diameter that captures the magnetic flux from the rotor magnets, and a plurality of electrically conducting coils 52 disposed in the slots of the core. The inner diameter of the stator 48 is larger than the outer diameter of the rotor 46. The rotor 46 is supported by a bearing 54 that allows the rotor 46 to rotate freely about an axis of rotation, and limits the motion of the rotor 46 in the axial direction so that the rotor 46 remains substantially centered inside the stator 48 both radially and axially. An electrical connection or wire 56 extends between the stator 48 and the control electronics.

It is understood that other types of electricity generators may be used and fall within the scope and spirit of this disclosure. Other permanent magnet generator types include, but are not limited to, interior permanent magnet synchronous generators, rotors that employ flux focusing magnet arrays, and axial flux generators using single or double sided stators. These alternative permanent magnet generator topologies are applied in various industries and would be obvious to those skilled in the art.

Figure 2D:
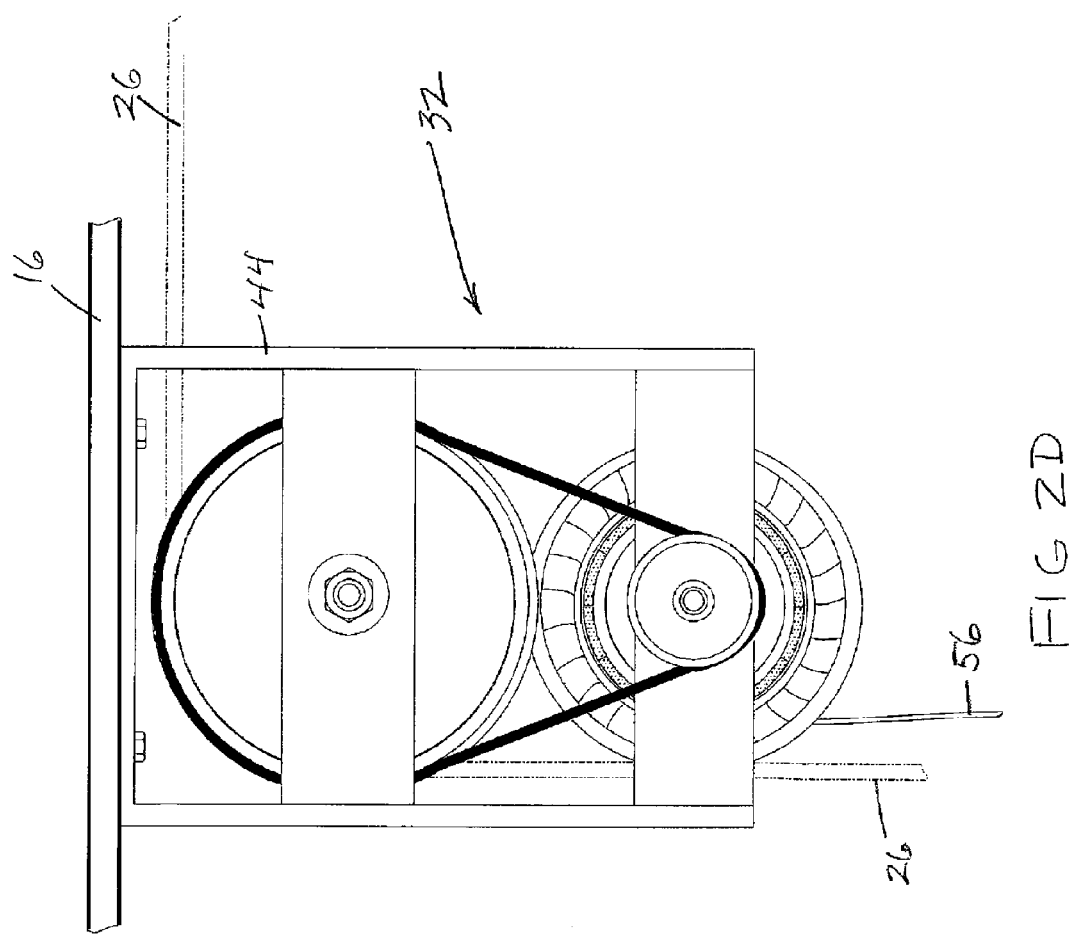
FIG. 2D illustrates a view of the pulley generator assembly of FIG. 2A utilized with a low speed pulley connecting a weight stack cable or belt at a 180 degree angle.

The belt or pulley system 42 includes a bi-directional low speed belt pulley 58 with a first diameter, a bi-directional high speed belt pulley 60 with a second diameter less than the diameter of the low speed pulley 58, and a belt 62 that couples the rotation of the pulleys 58, 60. The pulleys 58, 60 are rotatably mounted to the frame 44. The high speed belt pulley 60 is coupled to the rotor 46 of the electricity generator 40, and generally shares the same high speed bearing 54. The low speed belt pulley 58 is engaged with belt or cable 26 (as seen in FIGS. 2C and 2D), and is coupled to a pulley such as 28 that rotates due to the motion of the exercise equipment 10 and can generally share the same low speed bearing system. The high speed pulley 60 rotates in proportion to the motion of the low speed pulley 58 in either direction of rotation. The ratio of the rotational speed of the high speed belt pulley 60, $\omega_{HS}$ and the rotational speed of the low speed belt pulley 58 $\omega_{LS}$ is defined as the motion ratio, MR. The motion control ratio is determined by the diameters of the pulleys 58, 60, $D_{LS}$ and $D_{HS}$, respectively, as defined in equation 2:

$$MR = \omega_{HS}/\omega_{LS} \quad (1)$$

$$MR = D_{LS}/D_{HS} \quad (2)$$

where in deriving equations (1) and (2), it has been assumed that the belt 62 does not slip on the pulleys 58, 60. The selection of the motion ratio is a design parameter that can be optimized to the specific strength training equipment 10. A primary goal of the motion ratio of the pulley system is to minimize the size and the cost of the electricity generator 40. For a desired level of power generated, an electricity generator 40 that rotates at a higher speed requires proportionally less torque than would be required if the speed of the electricity generator rotation was equal to that of the low speed pulley 58. The size of the electricity generator 40 is proportional to the torque (and not the power), thus it is generally advantageous to define the speed of rotation of the high speed pulley 60 to be much greater than the speed of the low speed pulley 58.

There are limitations of the appropriate maximum value of the motion ratio. A significant factor is that the inertia of the energy harvester system 12, as reflected by the motion of the strength training equipment 10, increases quadratically as the motion ratio is increased. The inertia reflected by the motion of the strength machine appears as an apparatus mass to the user of the strength training equipment 10. For motion ratios that are too high, the apparent mass will be perceived by the user and may become objectionable. This effect is one factor that can be used to determine the upper limit of the desired motion ratio.

A variety of configurations may be used to create a desired motion ratio without departing from the scope and spirit of this disclosure. Different belt types including, but not limited to, V-belts, knurled belts, and tread belts may be used in accomplishing the function of the belt and pulley system 42. Furthermore, alternative methods of creating rotational motion ratios are well known and include, but are not limited to, teeth gears, friction gears, helical stages and planetary gears.

For example, the pulley generator assembly 32 can be suitably replaced by a gear generator assembly 64 illustrated in FIG. 2E. Instead of employing pulleys 58, 60, the gear generator assembly 64 utilizes a set of gears, namely a gear wheel 66 having a first diameter in meshing engagement with a pinion or gear wheel 68 having a second diameter less than the diameter of the gear wheel 66. The gear wheels 66, 68 are rotatably mounted to the frame 44. The pinion 68 is coupled to the rotor 46 of the electricity generator 40, and the gear wheel 68 is engaged with belt or cable 26.

Referring to FIG. 4A, the photovoltaic energy harvester includes a photovoltaic array 70 that converts ambient light energy from commercial lighting and/or sunlight in the equipment environment into electrical energy, and a parallel electrical energy storage element 72, such as a capacitor 74, connected at the output of the photovoltaic array 70. The array 70 generally includes a plurality of photovoltaic cells, connected in series, parallel or a combination thereof, to produce a desired output power characteristic for the electronics load of the feedback system 36 or to the control electronics. The output voltage of the photovoltaic energy harvester operates at a load current that results in a substantially constant voltage when connected to an electronics load or standby electronics load.

The parallel electrical energy storage element 72 is able to provide power to the electronics load or standby load when the available output power from the photovoltaic array 70 is less than the power required by the electronics load of the feedback system 36. When the power from the photovoltaic array 70 exceeds the power required by the electronics load, the parallel electrical energy storage element 72 can be charged resulting in an increase in stored energy.

Figure 4B:
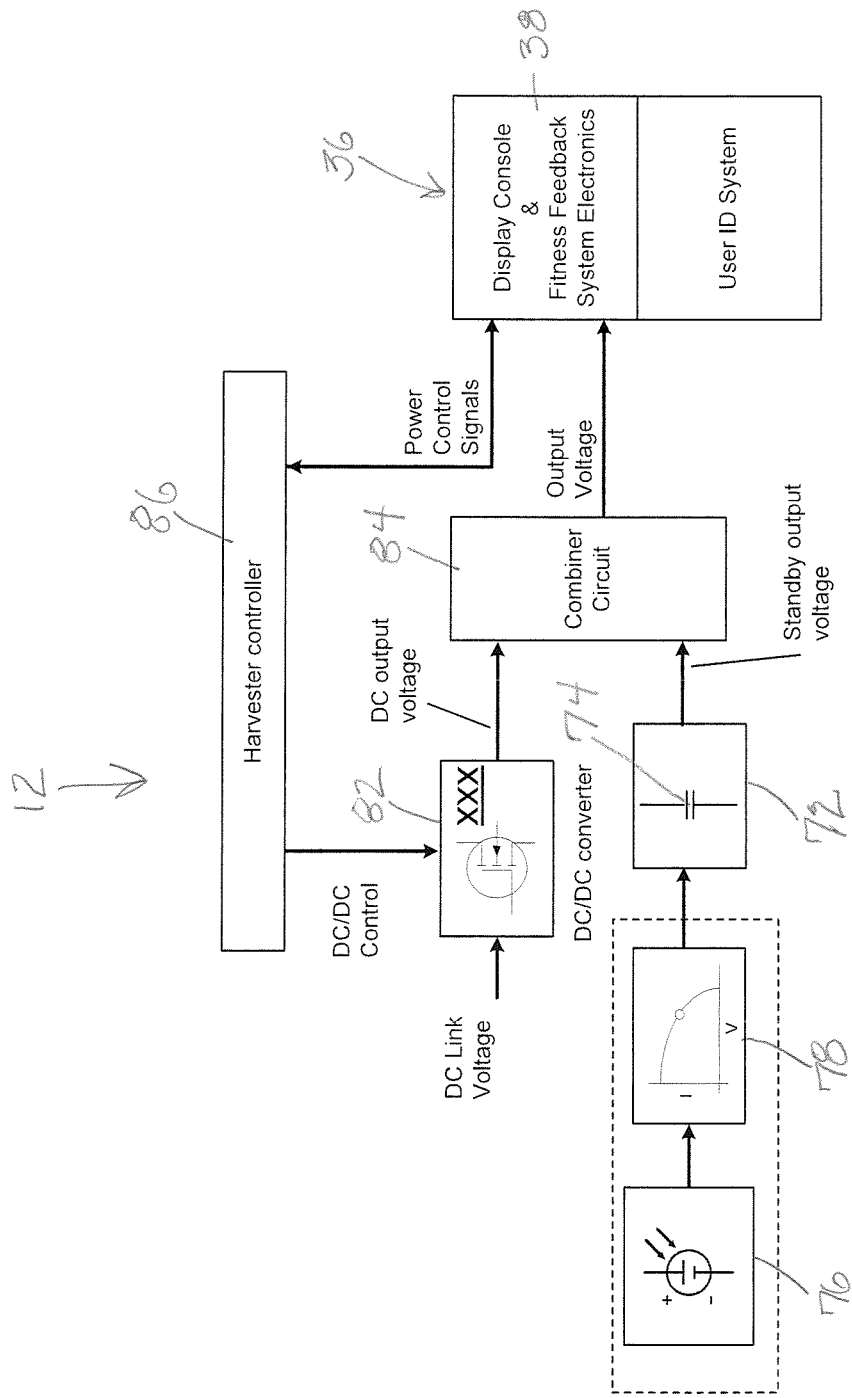
FIG. 4B is a block diagram illustrating an alternative embodiment of FIG. 4A showing the photovoltaic energy harvester with an MPPT apparatus.

In an alternative embodiment shown in FIG. 4B, the photovoltaic energy harvester comprises a photovoltaic array 76 that converts ambient light energy into electrical energy, and a maximum power point tracker (MPPT) 78. The output of the photovoltaic array 70 connects to the input of the maximum power point tracker 78. The output voltage of the maximum power point tracker 78 connects to the electronics load, or standby electronics load and the parallel electrical energy storage element 72. In this embodiment, the maximum power point tracker 78 is a DC/DC converter that can be controlled in such a way that the maximum power is harvested from the photovoltaic array 76 at any point in time. The same DC/DC converter can also be used in a mode that is used to control the amount of stored energy in the parallel electrical energy storage element 72. Those who are skilled in the art will recognize that there are a variety of well known maximum power point control apparatus and techniques that can be applied to maximize energy capture from the photovoltaic array 76. Those who are skilled in the art will also recognize that there are a variety of well known controlled apparatus and techniques that can be applied to manage the amount of energy stored in the photovoltaic energy storage element 66, and these techniques fall within a scope and spirit of the present disclosure.

As seen in FIGS. 1A and 1B, the photovoltaic energy harvester is a separate subassembly within the energy harvester system 12. In this embodiment, the array 70 or 76 of the photovoltaic energy harvester is located on a top end of the support portion 16 of the strength training equipment 10 at a location and in an orientation such that the ambient-radiated light energy is substantially orthogonal to the photovoltaic cells that comprise the photovoltaic array 70 or 76. The photovoltaic energy harvester has mechanical features to allow the orientation of the photovoltaic array 70 or 76 to be manually adjusted at the installed location in the fitness facility. The mechanical features allow the photovoltaic energy harvester to be rotated, tilted or otherwise positioned at an orientation that can maximize the capture of radiated light energy for a given location of the fitness equipment on which the harvester is installed. Advantages of this configuration include the ability to locate the photovoltaic array 70 or 76 precisely to capture the maximum amount of power from the ambient-radiated light and fitness environment.

In an alternative embodiment shown in FIGS. 3A and 3B, the photovoltaic energy harvester array 70 or 76 is integrated into the fitness feedback display console 38 of the weight machine 10. Advantages of this location are that the photovoltaic energy harvester may be packaged cost effectively into a single fitness feedback display assembly. In this embodiment, the array 70 or 76 will be close to the standby electronics load to which it is connected, and also the display console 38 will generally be easily accessible for cleaning and occasional removal of any soil or debris build up on the photovoltaic array 70 or 76.

A variety of photovoltaic array technologies may be used without departing from the scope and spirit of this disclosure. Examples of photovoltaic technologies include, but are not limited to, polycrystalline and monocrystalline silicone and variants thereof, and thin film technology such as amorphous silicone, cadmium telluride, CIGS, etc.

With further reference to FIG. 4A, the control electronics generally includes a three phase power inverter 80, a DC/DC converter 82, a combiner circuit 84 and a harvester controller 86 that controls components 80, 82 and 84. The AC terminals of the three phase power inverter 80 are connected to the three phase AC electricity generator 40 and can be considered the input terminals of the inverter 80. The DC terminals of the three phase power inverter 80 can be considered as the output terminals, and are connected to a DC link, which consists of an electrical energy storage element 88, such as a capacitor 90. The purpose of the three phase power inverter 80 is to convert the variable voltage amplitude, variable frequency AC input power to a DC output power that has a non-zero, non-negative average value of voltage. For proper operation of the energy harvester system 12, the DC output voltage of the inverter 80 can be controlled to be constant, but more generally may be varying as long as the condition of the non-zero, non-negative average voltage are met.

Furthermore, the purpose of the three phase power inverter 80 is to control the electricity generator 40 to operate efficiently, and therefore produce a desired electrical output power without requiring excessive mechanical power to be derived from the low speed pulley 58. The three phase inverter 80 consists of efficient power switching devices, such as MOSFETs, that are capable of being controlled by the harvester controller 86. The three phase inverter 80 may also consist only of diodes to operate a standard rectifier. Those who are skilled in the art will recognize that there are a variety of well known generator and inverter control techniques that can be applied to optimize the efficiency and/or the energy capture from the electrical generator 40 as well as the overall efficiency and/or energy capture of the energy harvester system 12.

Figure 5A:
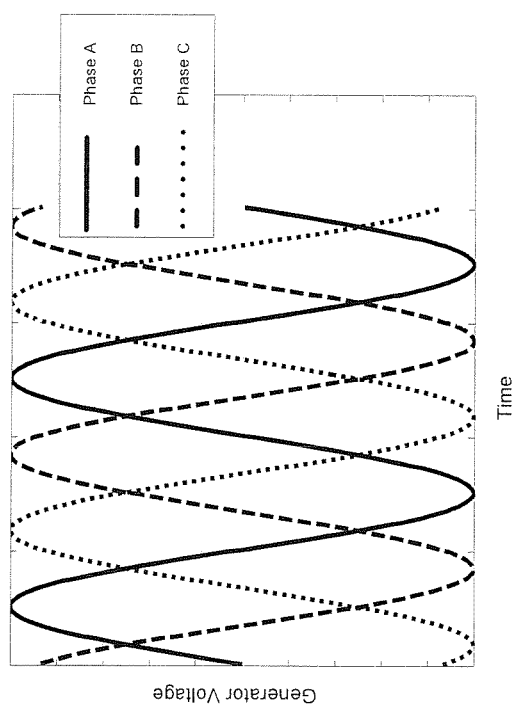
FIG. 5A illustrates corresponding three phase output voltages of the pulley generator assembly depicted in FIG. 2A, when the pulleys of FIG. 2A are in motion at a constant speed; and, FIG. 5B illustrates the motion and corresponding electrical signals of the control electronics depicted in the block diagram of FIG. 4A, when a user performs a repetition using the exercise equipment of FIG. 1A.
Figure 5B:
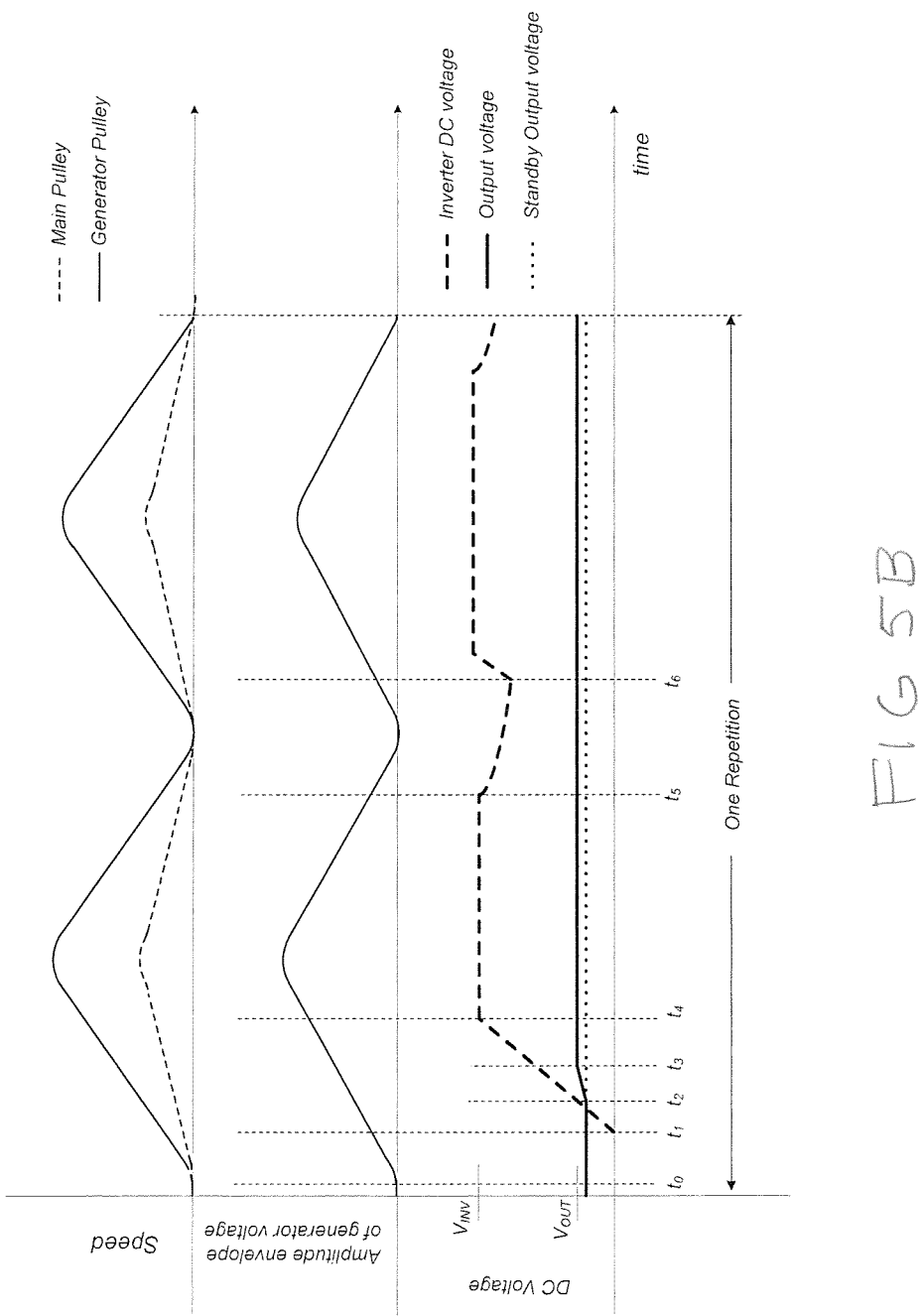

The DC/DC converter 82 provides a constant regulated output voltage, i.e. the DC supply voltage, for use by the electronics load of the feedback system 36. The input of the DC/DC converter 82 is connected to the DC link, the DC link generally operating at a higher voltage than the DC supply voltage and consisting of the capacitor 90 connected in parallel with the input of the DC/DC converter 82 and the output of the three phase inverter 80. The DC/DC converter 82 is capable of providing constant DC supply voltage even in the presence of varying DC link voltage caused by fluctuations of the power output of the three phase inverter 80 as depicted in FIG. 5B. The DC/DC converter 82 need only provide unidirectional power flow from the DC link 88 to the electronics load of the feedback system 36. The DC/DC converter 82 will generally operate as a buck converter, but may also operate as a boost converter if the DC link voltage is operating at a voltage that is less than the DC supply voltage. Those who are skilled in the art will recognize that there are a variety of well known unidirectional DC/DC converter types that can be used to effectively and efficiently convert a first generally varying DC input voltage to a second constant DC output voltage level.

The combiner circuit 84 is used to apply the best available power source to the electronics load of the fitness feedback system 36. In one embodiment, the combiner circuit 84 consists of two diodes with a first diode anode connected to the output of the kinetic energy harvester and a second diode anode connected to the output of the photovoltaic energy harvester. The cathodes of each diode are connected together at the combiner circuit output voltage node. If power is available from the kinetic energy harvester, the combiner circuit 84 will transfer kinetic power to the electronics load in a kinetic harvesting mode. If power is not available from the kinetic energy harvester, the combiner circuit 84 will apply only the power available from the photovoltaic energy harvester in a photovoltaic or standby harvesting mode. Those who are skilled in the art will recognize that there are a variety of well known techniques for combining the power output of two time varying DC voltages, not limited to the technique described above.

In an alternative embodiment, a combiner circuit 84 is not used. Instead, the output of the kinetic energy harvester is directly connected to the electronics comprised of fitness feedback system 36 so that the control electronics 80, 82, 86, control only the electrical power from the kinetic energy harvester. The output of the photovoltaic energy harvester is connected to provide power only to the electronics that comprise the user identification portion of the feedback system 36, and/or other circuitry that may require power while energy is not available from the kinetic energy harvester.

The control electronics regulate the instantaneous power that is developed by the kinetic energy harvester in the kinetic harvesting mode. During the use of strength exercise equipment 10, the input motion of the user can generally be considered as creating reciprocating motions. Therefore, during a single repetition or a series of repetitions there will be periods of slow motion, periods of fast motion, as well as brief periods of zero motion. When the exercise motion is slow (i.e. low velocity) the control electronics will harvest an amount of power that is less than the average output power from the kinetic energy harvester. When the exercise motion is fast, the control electronics will harvest an amount of power that is greater than the average output power from the kinetic energy harvester. During the brief periods of zero motion that are typical, for example, between the repetitions that comprise a set of exercise, the control electronics will harvest zero power from the exercise equipment 10.

Therefore, it can be observed that the operation of the kinetic energy harvester is such that the instantaneous power that is harvested from the exercises is generally not equal to (either more or less than) the output power supplied by the DC supply voltage of the kinetic energy harvester.

To observe the difference in instantaneous power at the output of the electricity generator 40 and the output power of the kinetic energy harvester (i.e. the DC supply voltage), the control electronics also includes the passive, electrical energy storage element 88, such as the parallel connected capacitor 90. When a total exercise motion is at or near a point of zero motion, the output power of the kinetic energy harvester will be substantially supplied by the electrical energy storage element 88, and therefore the electrical energy storage element 88 will be partially discharged. When a total exercise motion is at or near a point of fast motion, the electrical energy storage element 88 will be discharged as required, and the output power of the kinetic energy harvester will be substantially supplied by the electricity generator 40.

It should be reiterated that one intent of the present disclosure is to eliminate the need for any long term energy storage elements, such as rechargeable or non-rechargeable electrochemical batteries, as well as the need for any external power, so that the energy harvester system 12 is completely self-sufficient.

A variety of passive energy storage elements may be used without departing from the scope and spirit of this disclosure. For example, different types of capacitors including electrolytic, film, ultra capacitors and super capacitors can be used, as well as methods of inductive energy storage.

In one embodiment of the present disclosure, when a condition of very little motion or no motion persists, the control electronics detects this condition, and switches to the photovoltaic energy harvester or the standby harvesting mode where the average power of the electronics load is harvested from the photovoltaic array 70 or 76. The transition to the standby harvesting mode generally does not occur until the energy stored in the energy storage element 88 has been substantially discharged such that it can no longer supply power to the electronics load of the fitness feedback system 36. The photovoltaic energy harvester converts power in the form of radiated light in the ambient environment, for example, the commercial lighting typically used in fitness facilities into DC electrical power. The photovoltaic energy harvester can also convert radiated, naturally appearing sunlight that may be present in the exercise equipment environment into DC electrical power.

In one embodiment of the present disclosure, the output power from the photovoltaic array 70, 76 can be used directly (i.e. without the need for active electronics to control power from the array) as the output DC supply voltage. The photovoltaic energy harvester may be configured such that the electrical power created by the photovoltaic array 70, 76 is available as a separate DC supply voltage, or connected to the same output DC supply voltage terminals used during the kinetic harvesting mode.

Thus, it should be appreciated that in the kinetic harvesting mode, the energy harvester system 12 produces a steady output voltage and output power in the presence of reciprocating user input motion that is caused by the use of strength training equipment 10. Furthermore, when no input motion is present, the energy harvester system 12 is able to provide a reduced amount of power for the purposes of powering standby functions (the standby harvesting mode). An example of a powered standby function is a user identification system, via console 38, such as passive or active RFID system, capacitive or resistive touch screen systems, and other forms of contact and non-contact user identification systems. In the standby harvesting mode, the average power required by the electronics load is supplied by the photovoltaic array 70 or 76 of the energy harvester system 12.

It should be further understood that the control electronics is able to control the current in the electricity generator 40. When motion is present, the electricity generator 40 produces an AC output voltage amplitude that is proportional to the velocity of the exercise motion. The control electronics controls the current in the generator coils 52 so that the mechanical power available during the motion of the strength equipment 10 is converted to electrical power at the electrical terminals of the electrical generator 40. The control electronics converts the AC output voltage from the generator 40 into an average, positive DC link output voltage. The DC link output voltage may be controlled to be constant or varying, and in the varying case, the voltage will always have a positive value and therefore retain an average DC value. This DC link output voltage is generally not suitable for use by the exercise equipment electronics or a fitness feedback system 36. However, the DC/DC converter 82 of the control electronics also converts the variable DC link voltage into a constant DC supply voltage, typically 3.3 Vdc, 5 Vdc, or 12 Vdc (or any value that is less than the DC link operating voltage). The constant DC supply voltage is the output DC voltage that is suitable for use by the exercise equipment electronics such as the electronics, for the fitness feedback system 46.

As represented in FIG. 3A, the electrical power supplied from the kinetic voltage energy harvesters is used to independently, without any battery or external electricity, power the display console 38 of the feedback system 36 to identify, for example, via a display screen 92, a user of equipment 10, a particular weight resistance being used, the number of sets and repetitions expended, and the amount of rest between the sets of exercise. Other data may be provided to or input for processing by the user.

During typical operation of strength training equipment 10, the weight stack 24 and related pulleys 28, 30 are exposed to a typical range of linear and rotational velocities, respectively. For a given machine (e.g. a lateral pull down machine), this range of velocities depends on factors such as the exercise intent of the person using the equipment 10. The kinetic energy harvester is designed to reliably provide power to the fitness feedback system 36 over this typical velocity range, which corresponds to a range of different user styles and user workout intents. Though infrequent, under certain circumstances, the typical range of velocities can be exceeded substantially, which can be considered to be a high velocity condition. A high velocity condition may occur because of misuse, or in the event of an overly aggressive exercise movement by the user.

Figure 4C:
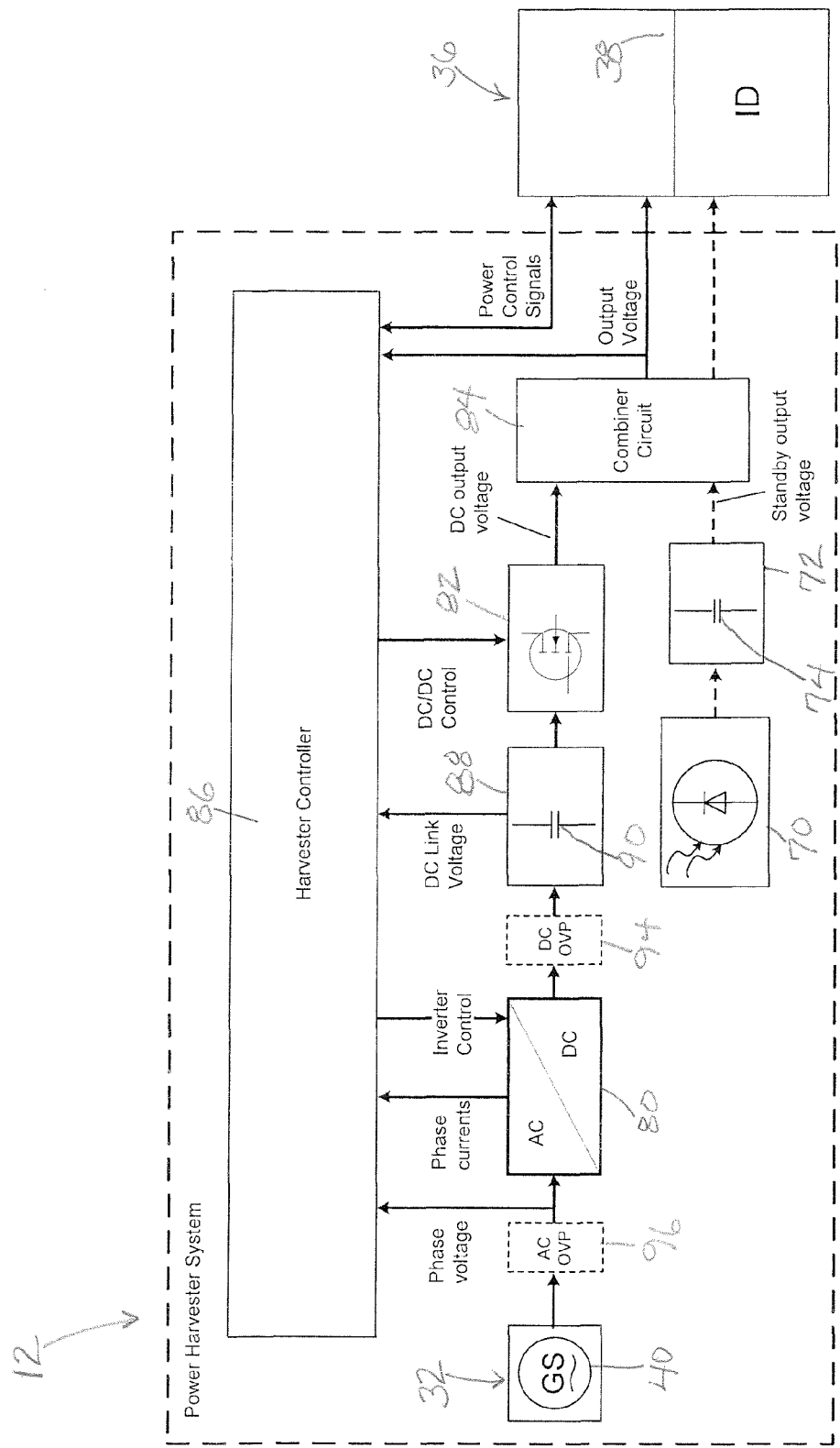
FIG. 4C is a block diagram similar to FIG. 4A showing the control electronics provided with overvoltage protection.

Without a provision to handle a high velocity condition, damage to the circuits and components (e.g. the AC to DC inverter 80) that comprise kinetic energy harvester can occur. In order to prevent damage during these conditions, an overvoltage protection arrangement, as depicted in FIG. 4C, is included in the kinetic energy harvester.

The overvoltage protection arrangement provides a means of reliably limiting voltage (AC voltage or DC link voltage, or both) during a high velocity condition. In one embodiment of the present disclosure, the overvoltage protection arrangement can be accomplished by means of a voltage clamp apparatus 94 disposed across the DC link 88 (i.e. a parallel connection). The clamp network consists of a fast switch with DC blocking capability, a surge-rated power resistor, and a means of controlling the switch to connect the resistor across the DC link 88 in response to a high velocity condition. When switched in, the resistor dissipates energy from the electricity generator 40 that would otherwise act to rapidly charge the DC link 88 capacitor and produce a damaging overvoltage condition. In an alternative embodiment, an AC switch 96 is disposed between the AC terminals of the electricity generator 40 and the AC terminals of the AC to DC inverter 80 (i.e. connected in series). The switch 96 is opened in response to a high velocity condition in order to prevent excessive voltage build up in the DC link 88. To those skilled in the art, it should be obvious that there are a variety of overvoltage protection methods, arrangements and topologies that may be applied while still falling within the scope and spirit of this invention. These arrangement include, but are not limited to series or parallel connections of switches, resistors, and overvoltage protection devices (such as TVS clamp diodes, MOV, or zener diodes) located in the DC link 88 or located between the AC terminals of the electricity generator 40 and the AC terminals of the AC to DC inverter 80.

Although the energy harvester system 12 has been described in use with the strength training equipment 10, it should be understood that the energy harvester system 12 can also be adapted to other exercise equipment having motion control components.

Various alternatives are contemplated as being within the scope of the following claims particularly pointing out and distinctly claiming the subject matter regarded as the invention.

What is claimed is:

1. An energy harvester system responsive to movement of a motion control arrangement of exercise equipment configured to move in a reciprocating motion path in response to a stimulus provided by a user, the energy harvester system comprising:
   a kinetic energy harvester for converting kinetic energy provided by the reciprocating movement of the motion control arrangement of the exercise equipment into electric power, the kinetic energy harvester including a generator assembly comprised of a generator operably connected to the motion control arrangement of the exercise equipment to generate electrical energy upon the movement of the motion control arrangement along the reciprocating motion path; and
   a feedback system connected to the exercise equipment to provide identification and workout performance data corresponding to the user of the exercise equipment,
   wherein electrical power from the kinetic energy harvester is delivered to the feedback system connected to the exercise equipment exclusive of any battery or external power source,
   wherein the generator is connected to control electronics for converting the electrical energy into the electrical power delivered to the feedback system, and
   wherein the control electronics includes a three phase power inverter, an electrical energy storage element, a DC/DC converter connected to the feedback system, and a harvester controller interconnected to the inverter, the electrical energy storage element and the DC/DC converter.

2. The energy harvester system of claim 1, wherein the control electronics includes an overvoltage protection arrangement connected to the inverter.

* * * * *